No. 715,571. Patented Dec. 9, 1902.
F. R. GILLINDER.
FISH JAR OR AQUARIUM.
(Application filed Sept. 9, 1902.)
(No Model.)
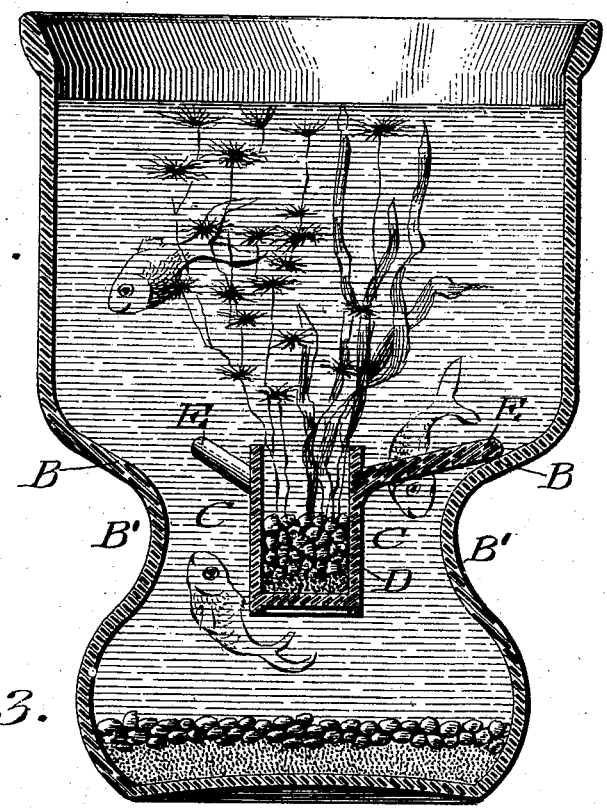
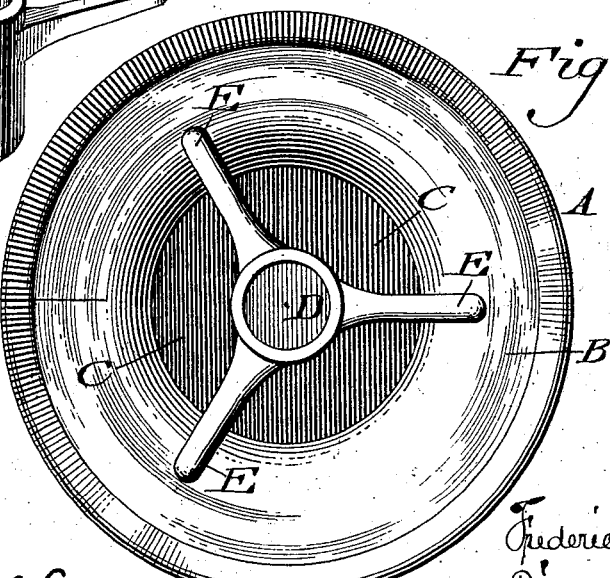
Witnesses
P. F. Nagle
L. Douville
Inventor
Frederick R. Gillinder
By Wiedersheim & Fairbank
Attorneys

UNITED STATES PATENT OFFICE.

FREDERICK R. GILLINDER, OF PHILADELPHIA, PENNSYLVANIA, ASSIGNOR TO GILLINDER & SONS, A CORPORATION OF PENNSYLVANIA.

FISH-JAR OR AQUARIUM.

SPECIFICATION forming part of Letters Patent No. 715,571, dated December 9, 1902.

Application filed September 9, 1902. Serial No. 122,649. (No model.)

*To all whom it may concern:*

Be it known that I, FREDERICK R. GILLINDER, a citizen of the United States, residing in the city and county of Philadelphia, State of Pennsylvania, have invented new and useful Improvements in Fish-Jars or Aquariums, of which the following is a specification.

My invention relates to an improvement in a fish-jar or aquarium, the construction of the same adapting a plant-holder to be supported therein without interfering with the freedom of the fish from the top to the bottom of the water, and vice versa, and other advantages are presented, as will be hereinafter set forth.

Figure 1 represents a vertical section of a fish-jar or aquarium embodying my invention. Fig. 2 represents a top or plan view thereof. Fig. 3 represents a perspective view of the plant-holder thereof.

Similar letters of reference indicate corresponding parts in the figures.

Referring to the drawings, A designates a fish-jar, the side of which is deflected inwardly, thus reducing the width of the same, as at B', forming the neck B in the interior of the jar for purposes to be hereinafter explained.

C designates a plant-holder consisting of a vessel or flower-pot D, the same being of considerably less diameter than the neck or shoulder B, so as to be suspended within the same, with a free space around the holder and having radiating arms E, which are of such length that they may be placed within the jar A on the shoulder B, and thus properly support said vessel, it being seen that the arms E are separated to such an extent as to present no material obstruction within the jar, and thus permit the fish to swim freely from the top to the bottom of the water, and vice versa, it being seen that the holder C may be readily removed and reapplied, and as the top of the holder is above the neck B and said top occupies the wide portion of the jar the plants are prevented from spreading or crowding about the interior of the neck B', which, if occurring, would interfere with the freedom of the fish through the jar or eventually result in preventing them from passing through said neck B' and reaching the top of the water, the fatal effects of which will be evident.

In the removal of the plant-holder the arms or vessel may be readily grasped from the top of the jar and the holder withdrawn without disturbing the sand, stone, or other matter at the bottom of the jar and injuring the plants.

Various changes may be made in the details of construction without departing from the general spirit of my invention, and I do not, therefore, desire to be limited in each case to the same.

Having thus described my invention, what I claim as new, and desire to secure by Letters Patent, is—

1. A fish-jar or aquarium having in its side a reduced neck and a shoulder on the interior of said neck, and a plant-holder having separated arms radiating therefrom and adapted to rest on said shoulder and be suspended within said neck.

2. A fish-jar or aquarium having a neck in its side, forming an inwardly-projecting shoulder, the upper portion of said jar being wider than said neck and a removable plant-holder having separated arms radiating therefrom, which arms are supported on said shoulder, the body of said shoulder being within said neck and the top of the same being above said shoulder and occupying the wide portion of the jar.

3. In a fish-jar or aquarium, a jar having a portion of its side inwardly deflected forming an internal shoulder and a plant-holder, consisting of a vessel and separated arms radiating therefrom, said arms being adapted to support said vessel within said jar on said shoulder.

FREDERICK R. GILLINDER.

Witnesses:
JOHN A. WIEDERSHEIM,
C. D. McVAY.